United States Patent [19]

Honkawa

[11] Patent Number: 5,570,785
[45] Date of Patent: Nov. 5, 1996

[54] COMBINED FLORAL DISPLAY AND KEEPSAKE CONTAINER

[75] Inventor: Bryan K. Honkawa, Los Angeles, Calif.

[73] Assignee: Roll International, Inc., Los Angeles, Calif.

[21] Appl. No.: 401,786

[22] Filed: Mar. 10, 1995

[51] Int. Cl.⁶ .................................................... B65D 85/52
[52] U.S. Cl. ............................ 206/423; 47/41.12; 47/66; 428/19
[58] Field of Search .................. 47/41.12, 66; D11/131, D11/157; D19/75; 428/13, 14, 19; 206/423, 45.34, 566

[56] References Cited

U.S. PATENT DOCUMENTS

| | | | |
|---|---|---|---|
| 1,788,058 | 1/1931 | Jyumi | 206/423 X |
| 2,945,314 | 7/1960 | Baldwin | 428/13 X |
| 3,269,578 | 8/1966 | Lewis | 206/45.34 X |
| 3,574,498 | 4/1971 | Zarinsky | 431/126 |
| 3,647,102 | 3/1972 | Cooley | 206/423 X |
| 3,704,776 | 12/1972 | Collins | 47/66 X |
| 3,816,224 | 6/1974 | Smart et al. | 47/41.12 |
| 4,143,191 | 3/1979 | Chavis | 428/13 |
| 4,221,078 | 9/1980 | Latham et al. | 47/41.12 X |
| 4,521,990 | 6/1985 | Murray . | |
| 4,601,130 | 7/1986 | Du Vall . | |
| 4,601,403 | 7/1986 | Pollitz | 215/228 |
| 4,941,572 | 7/1990 | Harris | 206/423 |

Primary Examiner—Bryon P. Gehman

[57] ABSTRACT

A combined floral display and keepsake is described. The floral display includes a container (1) with a bottom (4) and side walls (7). Flowers (13) are displayed by positioning them into a floral foam block (14) positioned in the floral container. A keepsake top (2) is secured along the outer side of the floral container walls by an attachment mechanism (9). When the floral arrangement is no longer fresh, the container, the bracket, the foam block and the flowers may be discarded, while the top and bottom portions of the keepsake remain as a useful and decorative article.

7 Claims, 5 Drawing Sheets

COMBINED FLORAL DISPLAY AND KEEPSAKE CONTAINER

BACKGROUND OF THE INVENTION

1. Field of the Invention

This invention relates to a combined floral display and keepsake container, and more particularly, to such a combination in which the bottom part of the keepsake container is positioned below the floral arrangement and the top of the keepsake container is positioned on the side of the arrangement as a decoration. The keepsake container maintains its decorative and useful functions after the floral arrangement has been discarded.

2. Description of Prior Art

Floral and other decorative arrangements are common gifts for a variety of occasions. It is popular among florists to sell floral arrangements along with keepsakes or decorative objects, such as decorative crystal or glass containers, that continue to have usefulness and meaning to the recipient of the gift after the floral arrangement is no longer fresh and has been discarded.

In the prior art, there are four general types of devices available for such purposes.

(1) Florists have tied keepsakes to the sides of floral arrangements. Although these devices are simple, they are difficult to transport, store and deliver. In addition, it is often difficult to simply attach a keepsake to a floral arrangement without an attachment mechanism designed specifically for such a purpose.

(2) Keepsakes and floral arrangements have been combined where the keepsakes are positioned in a floral foam block along with the flowers. These arrangements are easier to transport than devices that tie the keepsakes to the sides of the arrangements. Placing the keepsake into the foam, however, limits both the flexibility of the keepsake and the floral bouquet. The bottom of the keepsake must be made so that it can be inserted into the foam. The keepsake must also be relatively tall to extend above the bouquet. Conversely, the floral arrangements must be relatively small so that the keepsake can be seen above the flowers.

(3) Keepsakes and floral arrangements have been combined such that the floral arrangements are actually incorporated as part of the keepsakes. In these instances, the keepsakes are not independent from the floral arrangements but rather are integrated into the floral arrangements. If real flowers are used in these floral displays, the displays must be designed so that after the floral arrangements are discarded, the display still has aesthetic appeal. This requires a complicated and more expensive design than if the floral display can simply be discarded along with the flowers. Other designs of this type are specifically for artificial flowers. Typical of this design is U.S. Pat. No. 3,574,498, which describes a combined multi-purpose candle holder and flower arranger. This design, for artificial flowers, has no means for keeping the flowers fresh. In addition, as artificial flowers remain "fresh," the design does not deal with discarding the floral arrangement and hence is not intended or suitable for use independent of the floral arrangement.

(4) Keepsake and floral arrangements have also been combined where the keepsake is a container that holds the floral arrangement when the floral arrangement is fresh and holds other objects when the floral arrangement is discarded. U.S. Pat. No. 4,601,403 discloses a container with an invertible lid. In one orientation, a recess in the lid faces upward and a floral arrangement can be inserted into the cavity in the lid. In an inverted orientation, a closed end of the lid faces upward, such that the lid decoratively covers the container. This arrangement, however, is limited in the design of the keepsake container. In addition, it does not provide for a decorative part of the keepsake container to be independently displayed along with the floral arrangement.

The combined flower display and keepsakes in the prior art tend to be either simple but limited in scope, difficult to pack, store and transport, limited in their design, or complicated and for artificial floral arrangements. It should therefore be appreciated that there is a need for a floral configuration that:

(a) displays real flowers along with a keepsake container that, after the floral arrangement is discarded, remains useful and decorative;

(b) is flexible, allowing for a variety of sized bouquets and keepsake containers; and (c) is easy to store, transport and deliver to the recipient; and (d) allows for the decorative top of the keepsake container to be displayed along with the floral arrangement.

SUMMARY OF THE INVENTION

A principal object of the present invention is to provide an improved combined floral display and keepsake container of simple and practical construction that is economical to manufacture and easy to assemble, disassemble, store, package and transport.

This invention accordingly provides a simple means for displaying flowers in a floral arrangement. Flowers can be positioned in a foam block located in the cavity portion of a floral container. The top portion of the keepsake is secured to the outer wall of the floral container, either directly or indirectly using a bracket. If the keepsake top is secured using a bracket, the bracket can be positioned along the side of the floral container and the top portion of the keepsake container can be secured onto the bracket. The bracket can be independent from the wall of the floral container or be part of the wall itself. The lower portion of the keepsake container is positioned below the floral container, and used as the base of the floral arrangement. When the floral arrangement is discarded, the top of the keepsake container may be detached from the side of the floral container, the bottom of the keepsake container may be detached from the bottom of the floral container, and the keepsake container may be used independently, since it maintains its utility and aesthetic appeal after the floral arrangement is discarded.

DETAILED DESCRIPTION OF THE INVENTION

Figure 1:
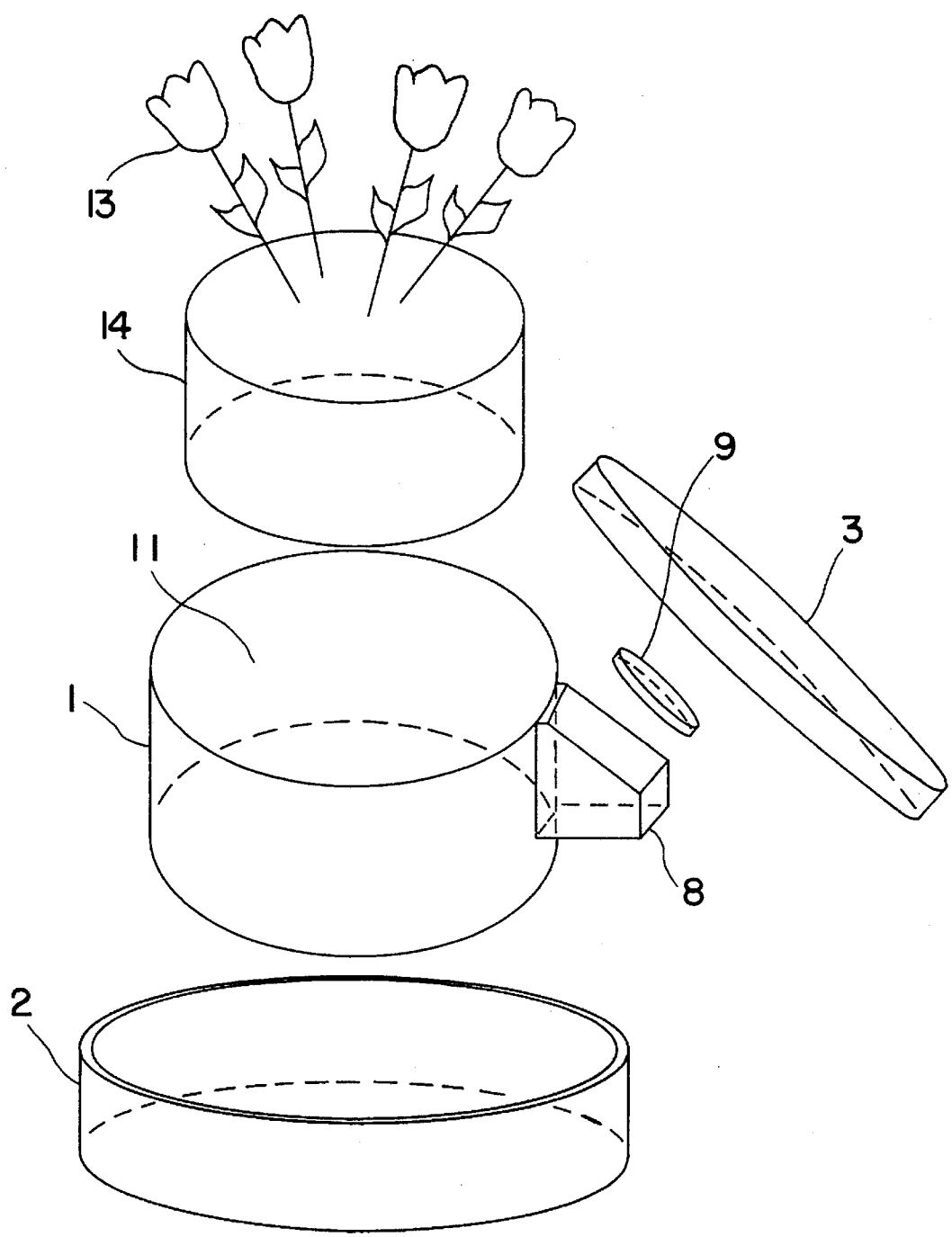
FIG. 1 is an exploded perspective view of a combined floral display and keepsake container in accordance with one preferred embodiment of the invention.

A typical embodiment of the invention is illustrated in FIG. 1. The combined floral display and keepsake container includes a floral container 1, keepsake bottom 2, and keepsake top 3.

Figure 3:
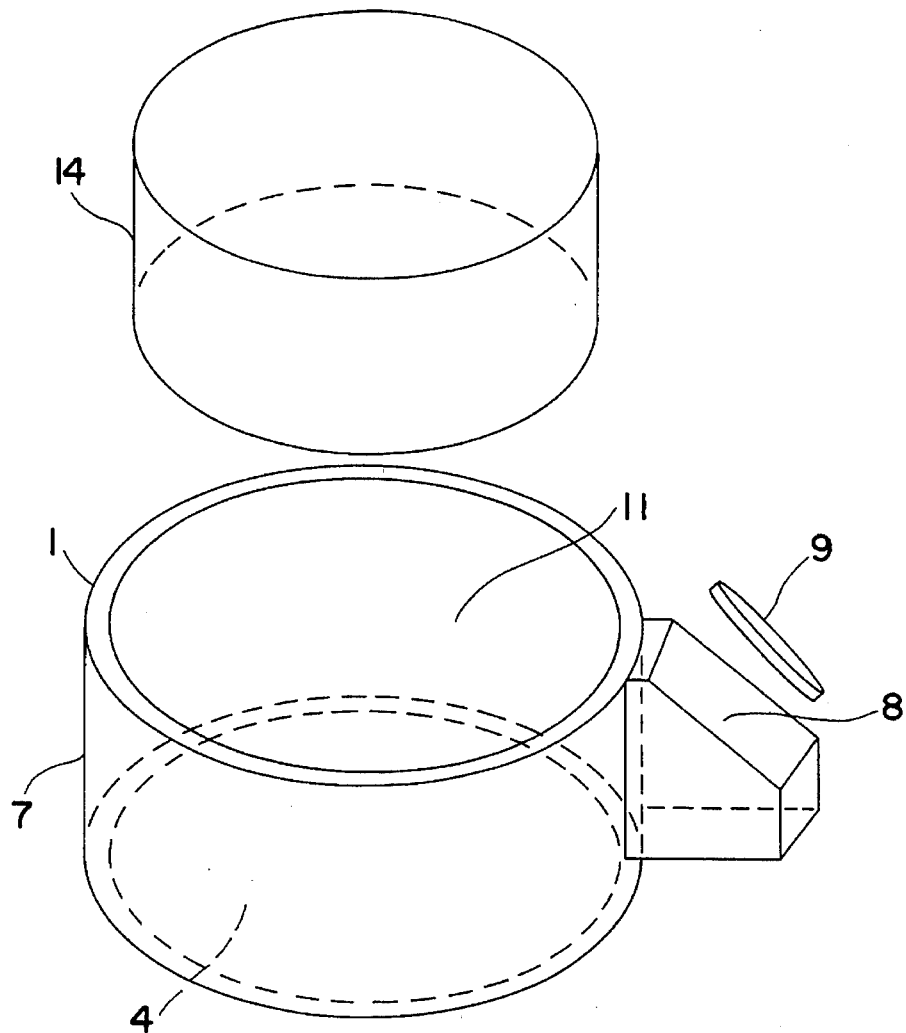
FIG. 3 is an exploded perspective view of the floral container and floral foam block.

As illustrated in FIG. 3, the floral container has a bottom 4. A floral container wall 7 is joined with the floral container bottom 4 to create a cavity 11 above the floral container bottom 4. The floral container bottom 4 and floral container 7 wall can be made of disposable plastic.

Figure 4:
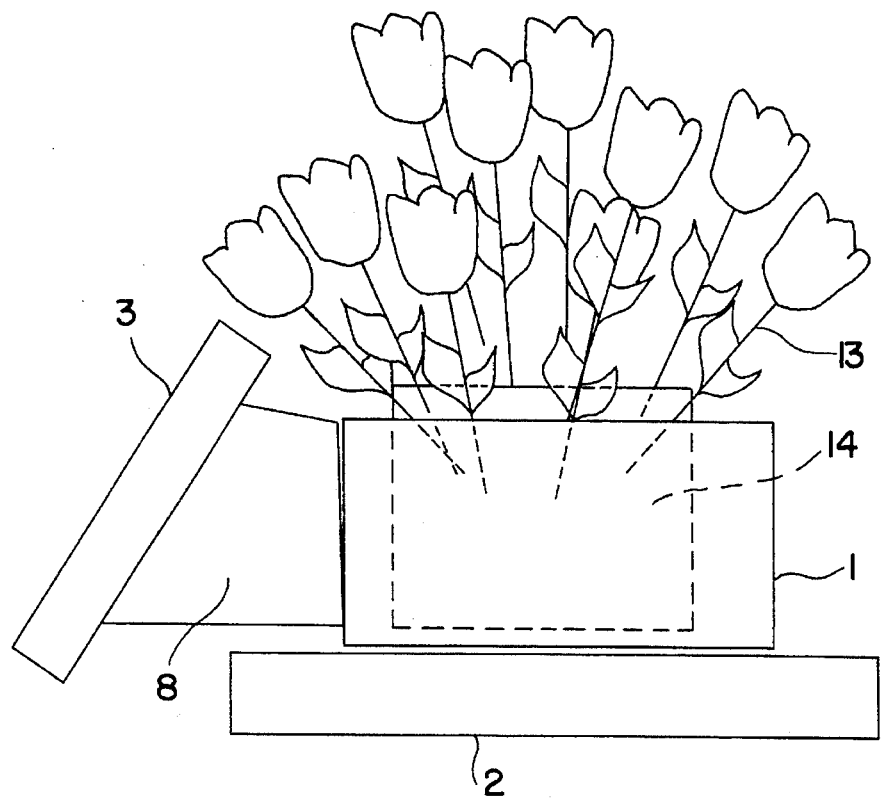
FIG. 4 is a side view of the combined floral display and keepsake container with the floral arrangement in place.

As shown in FIG. 1, a floral foam block 14 can be inserted into the floral container cavity 11. Once the floral foam block is in place, a floral arrangement can be created above the floral container by inserting the stems of the flowers 13 into the foam block 14. As shown in FIG. 4, the floral arrangement can be distributed around the central axis of the floral container. Water can be introduced into the floral foam block 14 to keep the flowers fresh.

As shown in FIG. 1, a bracket 8 is integral to wall of the floral container 7. The keepsake top 3 can be attached to the bracket using an attachment mechanism 9, thereby supporting the keepsake top 3 on the side of the floral arrangement.

When the floral arrangement is no longer fresh, the floral arrangement may be discarded. The floral foam block 14 may be removed from the container cavity 11 and may either be kept and reused or discarded along with the floral arrangement. The floral container 1 and bracket 8 may also be reused or discarded.

Figure 2:
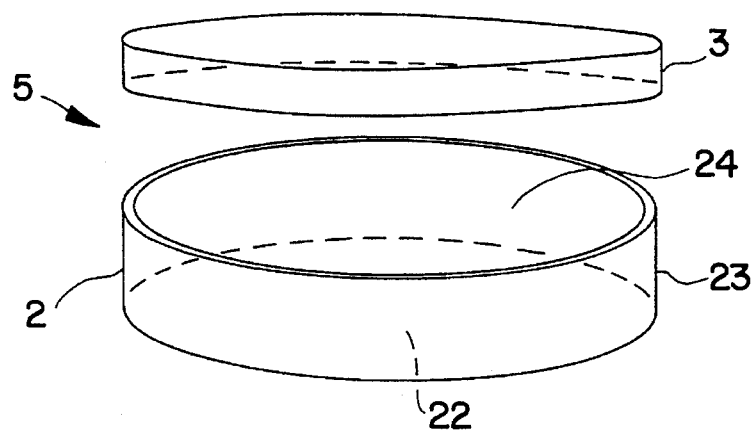
FIG. 2 is an exploded perspective view of the keepsake container.

As shown in FIG. 2, the keepsake container 5 consisting of the keepsake top 3 and keepsake bottom 2 remains as an independent decorative and useful unit that can be used to hold various items such as jewelry. The bottom portion of the keepsake container 2 has a bottom portion 22 and side wall 23. This keepsake bottom 2 and top 3 may be made of transparent material such as crystal or glass or other material such as ceramic, wood or plastic. The keepsake side wall 23 is joined with the keepsake bottom 22 to create a cavity 24 above the bottom of the keepsake bottom 22. The floral container 1 can be secured within this cavity 24. When the floral arrangement is discarded, the keepsake top 3 is positioned onto the keepsake bottom 2, forming a covered container.

Figure 6:
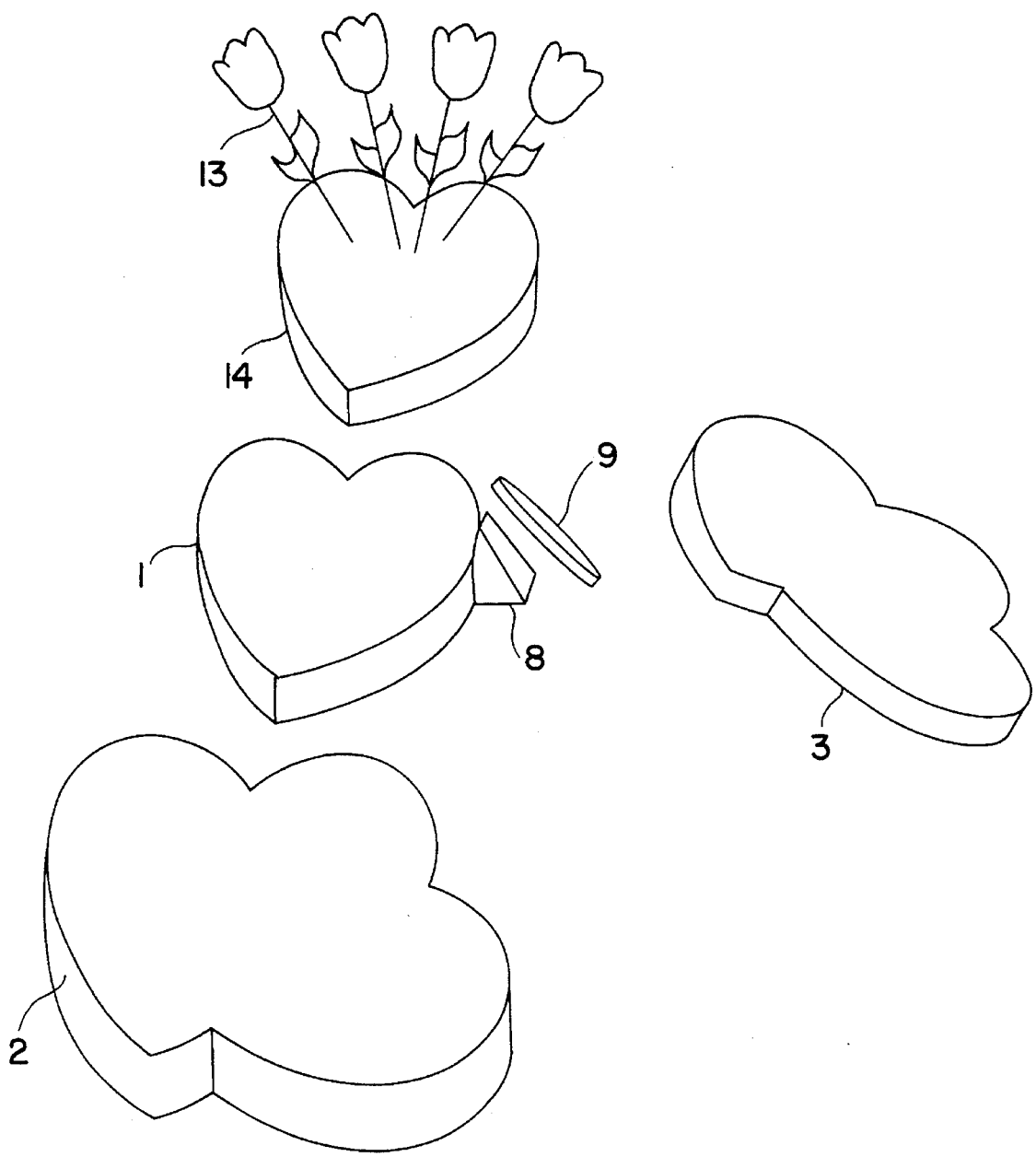
FIG. 6 is an exploded perspective view of a modified version of the invention where the shape of the keepsake container is interlocking hearts.

There are various alternative designs and shapes for the keepsake container 5. For example, the keepsake container 5 may be in the shape of interlocking hearts as illustrated in FIG. 6. The top 3 and bottom 2 of the keepsake container, in the shape of interlocking hearts, may be made of such transparent material as crystal or glass or other materials such as ceramic, wood or plastic. The bottom of the keepsake container 2 can have the same basic shape as the keepsake top 3, such that when the top and bottom portions are attached, they mesh.

There are numerous other types of keepsake container shapes and designs that can be used. For example, the keepsake container can be circular or square.

Figure 5:
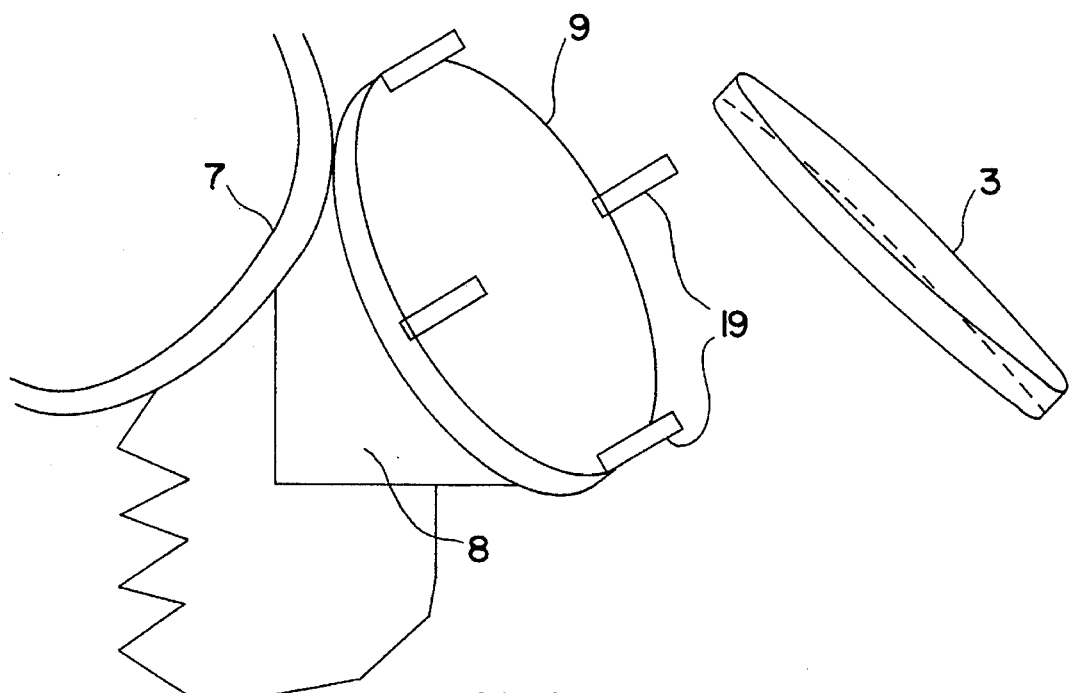
FIG. 5 is a detailed view of the bracket, keepsake top portion and attachment mechanism where the attachment mechanism is a series of clips.

There are various alternatives for the attachment mechanism 9. As shown in FIG. 5, in one embodiment, the attachment mechanism is a series of clips 19. One end of each clip 19 is secured onto the edges of the bracket 8, staggered around the outer edge of the bracket 8. The other end of each clip 19 extends outward from the bracket 8. The keepsake top 3 is positioned on the bracket 8 such that the clips secure the keepsake top 3 to the bracket 8 preventing the keepsake top from moving in any direction and preventing the keepsake top from detaching from the bracket 8. The keepsake top 3 can be easily removed from the bracket 8 when desired.

Figures 7A, 7B:
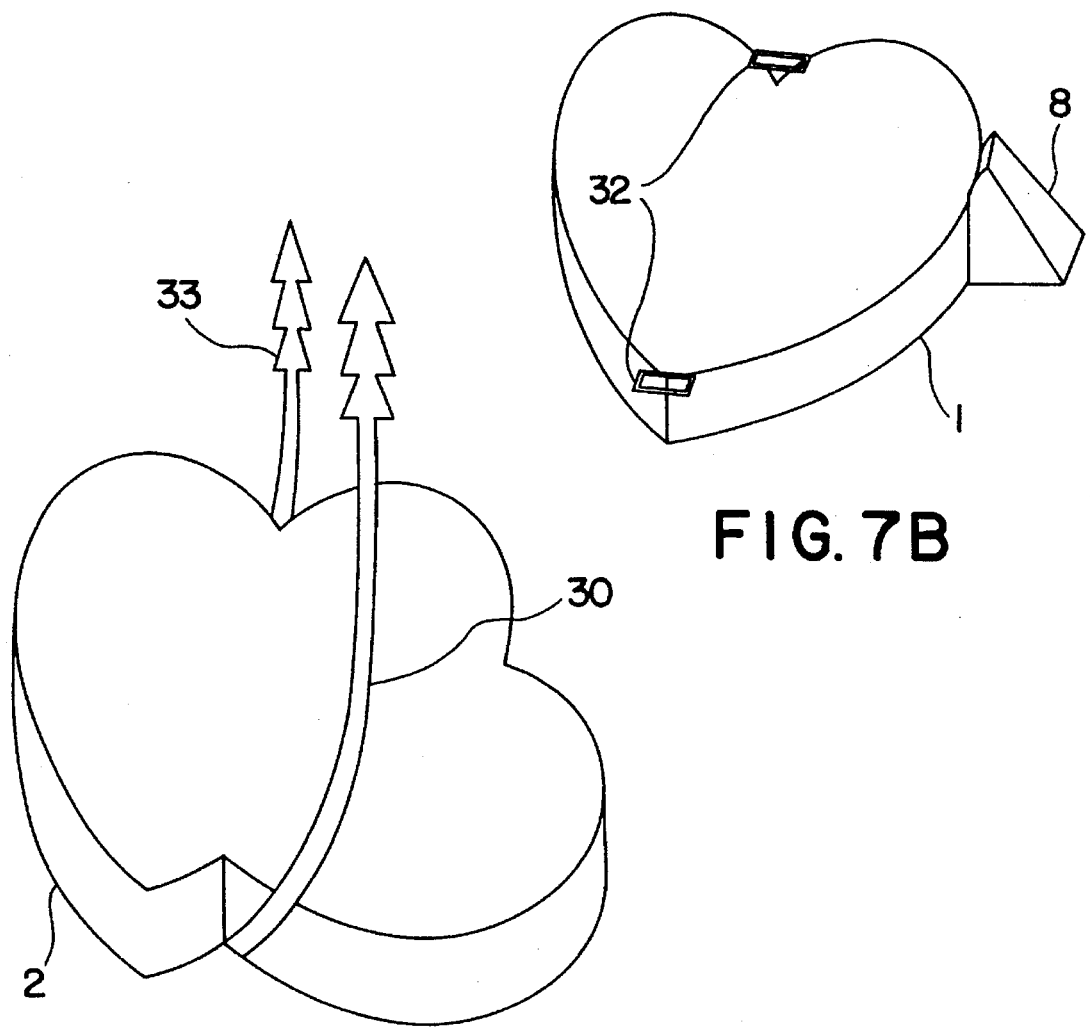
FIG. 7 is an exploded perspective view of the heart-shaped keepsake container showing a strap and slots as the attachment mechanism between the floral container and the keepsake bottom portion.

Finally, FIG. 7 illustrates an embodiment where the method of attaching the keepsake bottom 2 to the floral container 1 is a strap. A strap 30 is secured around the bottom of the keepsake bottom 2. The floral container 1 is positioned above the keepsake bottom 2. Each end of the strap 30 has flexible teeth or ridges 30. Located at opposite ends of the floral container 1 are two slots 32. To secure the floral container 1 above the keepsake bottom 2, each end of the strap 30 is inserted through a slot 32. The flexible teeth or ridges 33 of each strap end prevent the strap 30 from loosening.

The combined keepsake container and floral arrangement thus described has a number of significant advantages.

(a) The invention is simple, easy to assemble, and easy to disassemble when the floral arrangement is discarded.

(b) The invention is inexpensive to manufacture.

(c) Various types of keepsake containers can be attached to the side and the bottom of the floral arrangement and thereafter used when the floral arrangement is discarded. The present invention provides greater flexibility for florists since various keepsake container designs can be used with the various sized floral arrangements.

(d) The design allows the owner to keep a decorative, aesthetic and useful portion of the arrangement even after the floral arrangement is no longer fresh and must be discarded.

(e) The floral container is inexpensive, but sturdy and safe.

(f) The floral container and bracket may be disposable.

While the invention has been described in detail with reference to certain preferred embodiments, the principles involved are applicable to other applications as will be apparent to those skilled in the art. As illustrated above, various modifications can be effectuated within the spirit and scope of the invention. For example, the keepsake container designs can take various forms, including circles, squares or interlocking hearts. The keepsake container can be made of different materials such as ceramic, plastic, wood, poly resin, brass or metal.

The floral container can also be made in various shapes. In one embodiment shown, the base of the container is circular and the container walls form a cylinder to correspond to the base. In alternative embodiments, the base of the container can be other shapes, for example, square, and the container walls would correspondingly form a square shape.

In addition, the keepsake top can be secured directly to the wall of the floral container or can be secured to a bracket which is secured to the wall of the floral container.

Therefore, the scope of the invention should be determined by the following claims and their legal equivalents, rather than by the examples given.

I claim:

1. A multipurpose combined floral display and keepsake container comprising:

a. a floral container having a bottom and a container wall extending upwardly from the bottom, creating a cavity above the bottom for displaying a floral arrangement therein, b. a keepsake bottom positioned below said floral container and detachable from said floral container, c. a keepsake top connected to said container wall and detachable from said container wall, d. means for attaching said floral container to said keepsake bottom wherein said means is a strap secured around the keepsake bottom, said strap having enlarged portions at each end, and two slots positioned on the sides of said floral container for receiving and securing the ends of said strap to attach said keepsake bottom to said floral container, and e. means for securing said keepsake top to said floral container.

2. The combined floral display and keepsake container of claim 1 wherein the keepsake top and keepsake bottom are in the shape of interlocking hearts.

3. The combined floral display and keepsake container of claim 1 wherein a foam block is inserted into the cavity and positioned above the floral container bottom as a means for creating the floral arrangement.

4. A multipurpose combined floral display and keepsake container comprising:

a. a floral container having a container bottom and a container wall extending upwardly from the container bottom, creating a cavity above the bottom, b. a keepsake bottom, said floral container positioned on said keepsake bottom and said keepsake bottom detachable from said floral container, c. a keepsake top connected to said container wall and said keepsake top detachable from said container wall, d. means for attaching said floral container to said keepsake bottom, and e. means for securing said keepsake top to said floral container, said means including a bracket integral with the outer surface of said container wall.

5. The combined floral display and keepsake container of claim 4 where said means for attaching the keepsake top to said bracket is a plurality of clips positioned around the edge of said bracket with one end of each clip attached to said bracket and one end of each clip extending outward from the bracket.

6. The combined floral display and keepsake container of claim 4 wherein a foam block is inserted into the cavity and positioned above the floral container bottom as a means for creating a floral arrangement.

7. A multipurpose combined floral display and keepsake container comprising:

a. a floral container for holding flowers;

b. a keepsake bottom having a bottom portion and a wall portion extending upwardly from the bottom portion, creating a keepsake cavity above the bottom portion, wherein said floral container can be positioned on said bottom portion within said keepsake cavity;

c. a separate keepsake top connected to said floral container;

d. means for attaching said keepsake bottom to said floral container, said keepsake bottom being detachable from said floral container;

e. means for attaching said keepsake top to said floral container, said keepsake top being detachable from said floral container;

f. means for securing said keepsake top to said keepsake bottom, forming a keepsake container to contain objects within said keepsake cavity, when said floral container is discarded.

* * * * *